T. SANDSTROM.
SHORT TURN VEHICLE GEAR.
APPLICATION FILED FEB. 12, 1908.
920,662.
Patented May 4, 1909.
2 SHEETS—SHEET 2.
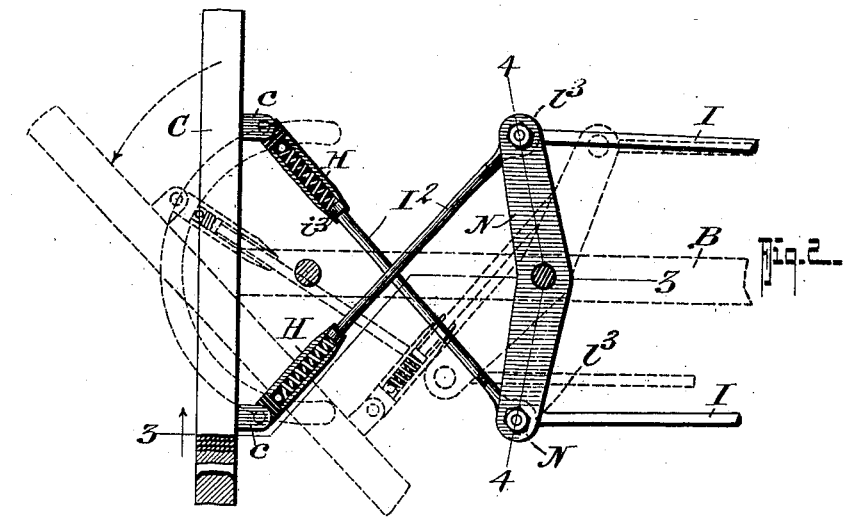
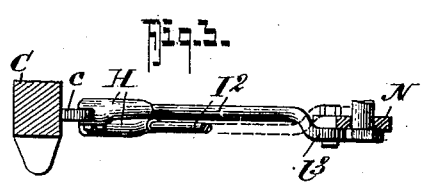
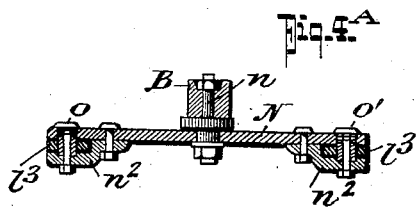
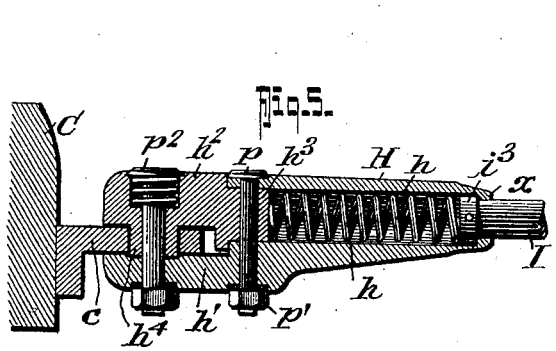
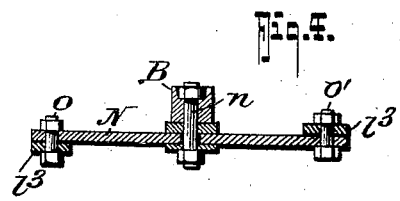
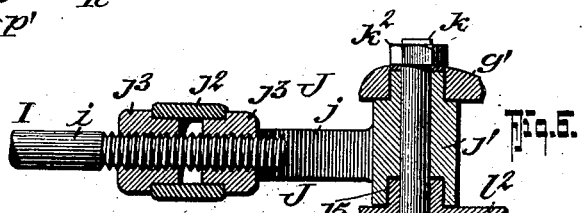
WITNESSES:
John T. Schrott
Charles H. Wagner
INVENTOR
Theodore Sandstrom.
BY
Fred G. Dieterich & Co
ATTORNEYS

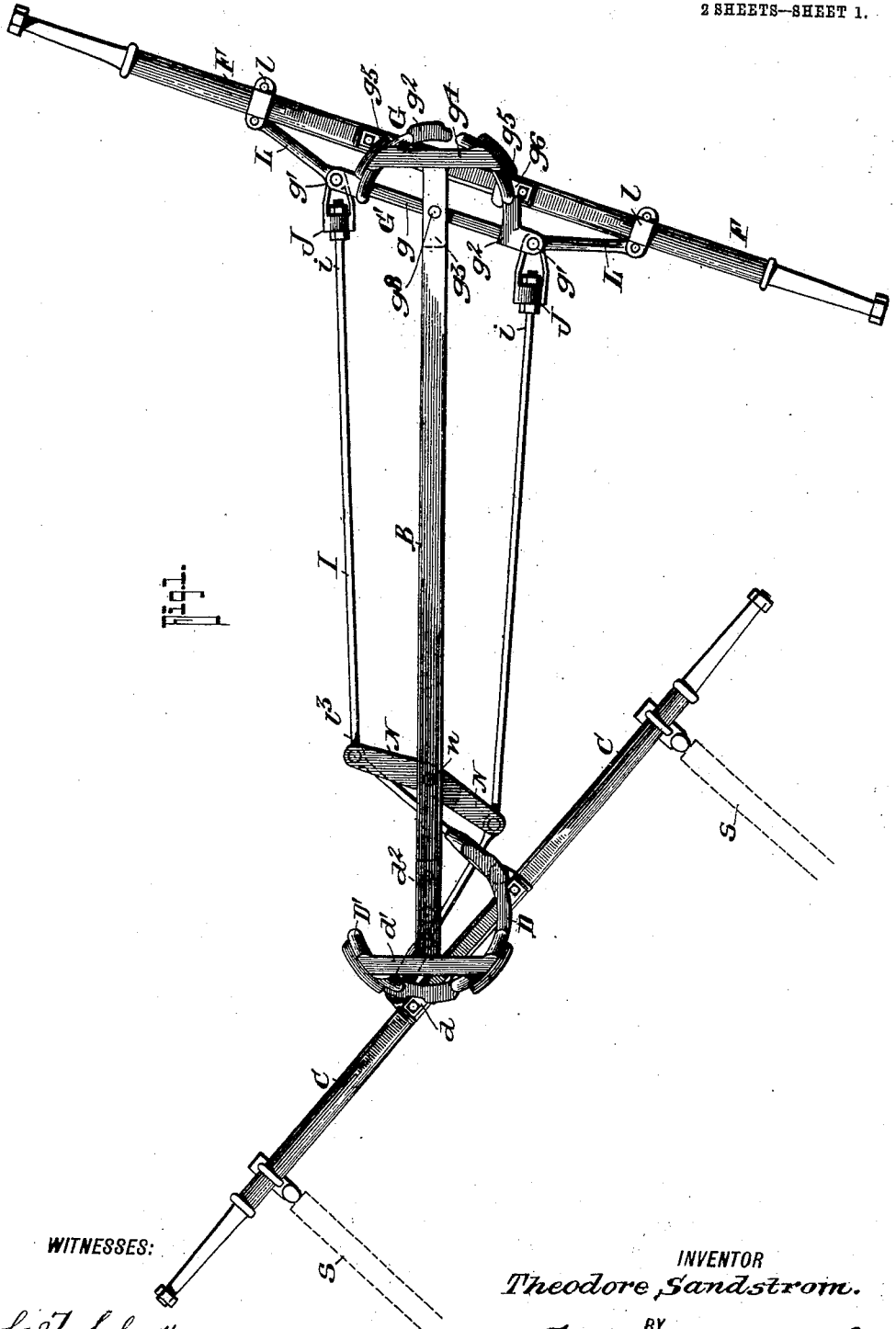

UNITED STATES PATENT OFFICE.

THEODORE SANDSTROM, OF INDIANAPOLIS, INDIANA.

SHORT-TURN VEHICLE-GEAR.

No. 920,662.  Specification of Letters Patent.  Patented May 4, 1909.

Application filed February 12, 1908. Serial No. 415,466.

*To all whom it may concern:*

Be it known that I, THEODORE SANDSTROM, residing at Indianapolis, in the county of Marion and State of Indiana, have invented a new and Improved Short-Turn Vehicle-Gear, of which the following is a specification.

My invention relates to improvements in that class of short turn gear mechanisms that embody front or fifth wheel devices, rear or sixth wheel devices and coupling means that join the said front and rear devices, and it has for its object to provide a vehicle gearing of the general character stated, of a simple and inexpensive construction, in which the several parts are especially designed for transmitting the strain from one axle to the other in a direct, uniform and effective manner.

My invention also has for its object to provide an improved means for connecting the coupling bars with the front and rear axles, whereby to automatically adjust the coupling shackles as they wear down to keep them from rattling.

My invention consists in the peculiar construction and arrangement of parts, hereinafter fully described, specifically pointed out in the appended claims and illustrated in the accompanying drawings, in which:—

Figure 1, is a plan view of my improved short turn vehicle gear. Fig. 2, is a diagrammatic plan view that illustrates the relative arrangement of the yieldable front or shackle ends of the crossed coupling rods. Fig. 3, is a detail longitudinal section of parts shown in Fig. 2, and taken substantially on the line 3—3 on Fig. 2. Fig. 4, is a cross section, taken on the line 4—4 of Fig. 2. Fig. 4ª, is a similar view of a modified construction. Fig. 5, is a longitudinal section of one of the yieldable or front coupling shackles hereinafter referred to. Fig. 6, is a similar view of one of the rear coupling members hereinafter specified.

In the construction shown in the accompanying drawings, the front axle C to which the shafts s—s are connected in the usual manner, is secured on the under side of a cross bar d that is an integral part of the lower fifth wheel section D upon which rides the upper fifth wheel section D', the two members D and D' having interlocking flanges and grooves for holding them in contact during ordinary use.

The upper fifth wheel member D' has an integral cross bar d' that has an extension $d^2$ that projects at right angles to the part d' and to which the front end of the reach bar B is bolted as shown.

While I have illustrated the form of fifth wheel device as shown and described, I desire to say that any of the ordinary forms of fifth wheel devices may be used instead.

The rear or sixth wheel device, as shown, is constructed similar to the front or fifth wheel device and the said sixth wheel device includes a bottom section G' having a cross member g, the ends of which terminate in apertured ears g'—g' to which the rear shackles of coupling members presently again referred to are connected. The member G' also has flanges $g^2$—$g^2$ for coacting with the circumferential ribs $g^5$—$g^5$ of the upper sixth wheel section G that includes a cross bar $g^4$ formed with a right-angled extension $g^3$ to which the rear end of the reach bar B connects and through which passes the king bolt $g^8$. The member G' is also formed with a cross bar $g^6$, to the under side of which is clipped the rear axle F.

By referring now more particularly to Fig. 3, it will be seen the front axle C has a pair of rearwardly projected apertured ears c—c to which are pivotally connected the front shackles H that join with the front ends of the coupling rods I. The main portions of the rods I—I extend substantially parallel with the reach bar B, and have their rear ends i connected with shackles J—J that pivotally connect with the extensions g'—g' of the cross bar g of the lower sixth wheel section G'.

To provide for proper adjustment of the rear ends of the rods I the shackles J are preferably constructed as shown in Fig. 6, by reference to which it will be seen the said shackles each comprise a yoke member j having a vertical sleeve j' for receiving the pivot bolt k that couples the shackle to the extension g'. The other end of the yoke member j terminates in a horizontal sleeve $j^2$ that receives the oppositely disposed internally threaded nuts $j^3$ for engaging the threaded rear end i of the rod I, it being understood the nut and yoke member connection as shown, provides for a simple means of adjustably connecting the rods I to the shackles J.

To relieve the sixth wheel members G' from unnecessary strain, bracket irons L are secured to the rear axle F by clips $l$, each of which has an apertured boss $l^2$, see Fig. 6 for fitting the seat $j^5$ in the sleeve $j'$ and receiving the bolt $k$, and for holding the bolt nut $k^2$ from working loose, the boss ends of the brackets L each have a seat $l^3$ to receive a stout coiled spring M that expands against the bolt head $k^3$, as shown.

The front end of the main rod portions are formed with apertured heads $i^3$ for pivotally connecting with the opposite ends of a cross lever N fulcrumed on the stud $n$ that connects it with the reach bar B, see Fig. 1, by reference to which it will be seen that from their point of connection with the lever N the front ends of the rods I are bent inwardly and across each other, and have their ends connected with the front shackles H, the construction of which is shown in Fig. 5 and which forms an essential feature of my present invention.

In the simplest form the cross lever N may be a flat link as shown in Fig. 1, clipped at the ends to the rods I by a simple bolt and nut connection $o$—$o'$ but for keeping the bolts $o$ from working loose the ends of the lever N may be formed with shackles $n^2$ as shown in Fig. 4ª, the bolts $o$ in this form being spring pressed to keep the nuts $o'$ in a tight frictional engagement with the under and removable member of the shackle $n^2$.

The crossed portions $I^2$—$I^2$ of the coupling rod I have their ends terminating with a plunger head $i^3$—$i^3$ for sliding in the cylindrical chambers $h$ of the shackles H. Each shackle H consists of a main portion having the cylindrical chamber $h$ open at the forward end and having an extension $h'$ for receiving a detachable portion $h^2$ that has a plug $h^3$ for fitting into the open end of the chamber $h$, a pendent lug $h^4$ that passes through the apertured ear $c$ projected from the axle.

The shackle part H is secured to the part $h'$ by the bolt $p$ that passes down through the chamber $h$, and the nut $p'$, it being also secured to the main shackle portion by the pivot bolt $p^2$.

From the foregoing description, taken in connection with the accompanying drawings, the complete construction and the advantages of my invention it is believed will be readily apparent to those skilled in the art to which it appertains.

By reason of connecting the rods I directly to the front and rear axles and crossing their front ends at a point in advance of the cross lever N, the proper relative movements of the front axle are transmitted to the rear axle, and since the shackles J are coupled to the brackets L on the rear axle F as well as to the sixth wheel, the sixth wheel will be relieved of the thrust and pull strains of the rods which are transmitted directly to the axles, while the shifting of the rods turns the sixth wheel devices.

The front shackle connection provides for taking up the wear on the shackles, prevents rattling and at the same time compensates for any twist or irregular thrust or pull movement of the combined straight and crossed rod members, the construction of the front shackles also providing for a simple means for connecting the rods to the shackles and for holding the buffer springs, which latter so act on the plunger ends of the rods that when on a short turn provision is made for the "take up" it has to have, while when on a straight way the plunger ends of the crossed rods are drawn tightly against the inside flange or collar $x$ at the front ends of the chamber $h$.

As the rods I shorten on a short turn, the springs at the ends of the rods act as hold backs so as to cause the two axles to work uniformly and smoothly together.

Having thus described my invention, what I claim and desire to secure by Letters Patent, is:—

1. The combination with the front and the rear axles, the fifth and sixth wheel mechanisms mounted respectively on the front and rear axles, each of said mechanisms including an upper member, a lower member, and a reach bar connecting the upper members; of a cross lever fulcrumed on the reach bar between the two mechanisms, coupling rods that connect with the outer ends of the cross lever that extend rearwardly in parallelism and connect with the sixth wheel mechanism, the front ends of the said rods being crossed over and yieldable connections that join the said rods with the front axle.

2. The combination with the front and rear axles, the fifth and sixth wheel mechanisms, the reach bar, bracket members projected from the rear axle and a reach bar that connects the fifth and sixth wheel mechanisms; of a cross lever centrally fulcrumed on the reach bar, a coupling rod pivotally connected to each end of the cross lever, the said rods extending rearwardly substantially parallel with the reach bar, pivotal connections for joining the rear ends of the said rods with the sixth wheel mechanism, and the brackets projected from the rear axle, the front ends of the said rods being crossed over, and yieldable connections that join the crossed ends of the said rods with the front axle.

3. The combination with the front and the rear axles, the fifth and sixth wheel mechanisms mounted on the axles, said mechanisms each consisting of a lower member fixedly mounted on the axle and an upper member movably mounted on the lower member, and a reach bar that joins at the ends of the upper members of the said mechanisms; of a cross lever fulcrumed upon the reach bar, rods that connect with the ends of the said cross member, said rods extending in parallelism rearwardly and connected with the sixth wheel mechanism, the front end of the said rods being crossed over and a yieldable connection that joins the said front ends with the axle.

4. In a vehicle gearing of the character described, comprising a front and a rear axle, the fifth and sixth wheel devices, a reach bar and a cross lever fulcrumed on the reach bar near its forward end, the front axle having apertured brackets; of rods pivotally connected with the ends of the cross lever and to the rear axle, the front ends of the said rods being crossed over and having plunger heads, shackles for connecting the ends of the cross rods with the front axle brackets, said shackles each comprising a main portion having an open socket, a spring contained therein, engaging the plunger head of the crossed rod, a plug detachably connected with the main shackle member that forms the closed end of the spring holding socket and means for securing the plug member to the main portion of the shackle, substantially as shown and for the purposes described.

5. A vehicle gearing that comprises the following elements in combination, with the front and rear axles; a means for transmitting motion from one axle to the other, which consists of a reach bar on which the rear axle is fulcrumed, the upper sixth wheel member fixedly held on the rear end of the reach bar, a lower sixth wheel member secured on the rear axle that coacts with the upper sixth wheel member, the upper fifth wheel member fixedly mounted on the front end of the reach bar, the lower fifth wheel member secured on the front axle that coöperates with the upper fifth wheel member, a cross lever fulcrumed on the reach bar, rods that extend from the said lever and connect with the rear axle, the front end of the said rods being crossed and yieldable connections that join the crossed ends of the rod to the front axle, all being arranged substantially as shown and described.

THEODORE SANDSTROM.

Witnesses:
BERT CRITSER,
GEO. DICKEY.